April 11, 1967 F. A. KAPRAL 3,313,289
IMPLANT CHAMBER
Filed June 23, 1964

INVENTOR
FRANK A. KAPRAL
BY Seidel & Gonda
ATTORNEYS.

United States Patent Office 3,313,289
Patented Apr. 11, 1967

3,313,289
IMPLANT CHAMBER
Frank A. Kapral, 1065 Maple Ave.,
Ardsley, Pa. 19038
Filed June 23, 1964, Ser. No. 377,202
7 Claims. (Cl. 128—1)

This invention relates to a chamber adapted to be inserted within a body cavity of an animal. The chamber is used for growing organisms or cells within the animal and to evaluate the effect of the body constituents of the animal upon the organisms or cells.

Medical research relies heavily upon experimental animals for simulating conditions within the human body. This invention deals with apparatus which can be implanted within a cavity in an animal to artificially induce a simulated condition and study the effect on the animal. More particularly, the present invention is particularly adapted for growing an organism or tissue cells in a living animal and studying the effects of the body constituents or environment of the animal on the organism or tissue cells.

Accordingly, it is an object of this invention to provide an implant chamber.

A further object of this invention is to provide an implant chamber which is adapted to be inserted within a body cavity of a living animal in which an organism or tissue cells can be grown after the chamber has been inserted within the animal.

A still further object of this invention is to provide an implant chamber of the aforementioned character from which samples of the growth can be removed from time to time for study without removal of the implant chamber.

Yet another object of this invention resides in the provision of an implant chamber characterized by its ease of assembly and disassembly and the simple manner in which it can be constructed using a minimum number of components.

A still further object of this invention is to provide an implant chamber which is chemically inert with the body constituents and tissues of the animal in which it is implanted.

A still further object of this invention is to provide an implant chamber whose components are reusable.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
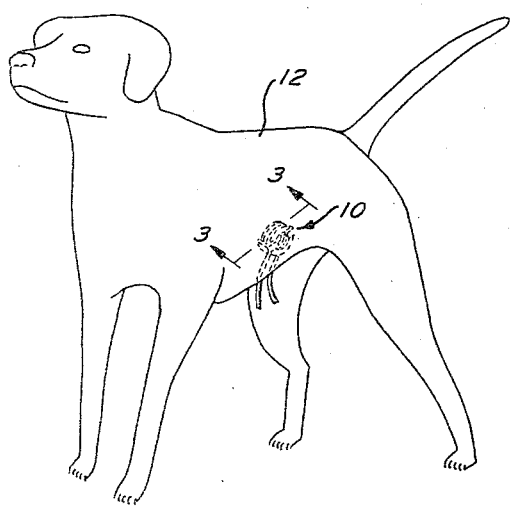
FIGURE 1 illustrates a perspective view of an experimental animal in which the implant chamber of the present invention has been inserted.

The implant chamber is generally designated by the numeral 10 and is adapted to be inserted within a body cavity of an animal such as an experimental dog 12. For example, the implant chamber is adapted to be inserted within the peritoneal cavity in the dog 12.

The implant chamber 10 is formed from a resilient, silicone rubber ring 14. A membrane 28 and a membrane 30 are adapted to be placed over the opposed faces 13 and 15 of the ring 14 which are substantially perpendicular to the axis of the ring. The membranes 28 and 30 close the ends of the orifice 17 which is substantially parallel to the axis of the ring. The membranes 28 and 30 together with the ring 14 thus form a hollow chamber.

Many types of membranes such as dialysis, millipore, cellulose acetate, silicone rubber, and plastic of various types may be used. Some of these membranes allow passage of very small molecules such as gases only; others pass molecules having a molecular weight up to 10,000; others pass still larger molecules, or all molecular species, but not bacteria or viruses, etc.

The membranes 28 and 30 are selected so as to be impervious to the growth deposited within the hollow chamber. However, certain body constituents within the tissues of the animal 12 are allowed to freely flow through the membranes 28 and 30.

Figure 2:
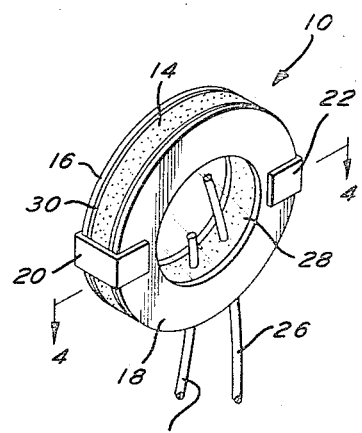
FIGURE 2 is a perspective view of the implant chamber comprising the subject matter of the instant invention.
Figure 3:
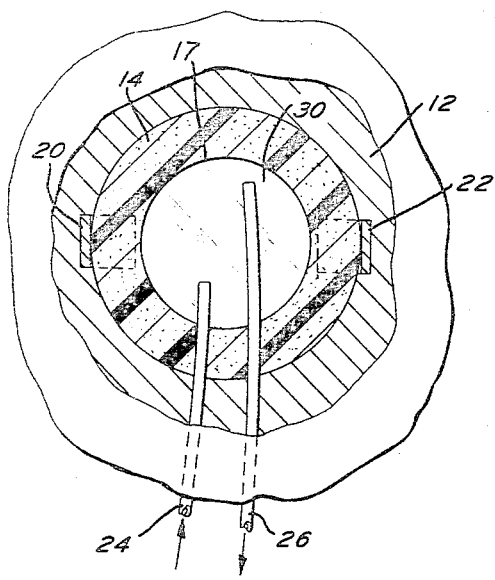
FIGURE 3 is a cross sectional view taken substantially along the plane indicated by the line 3—3 of FIGURE 1.
Figure 4:
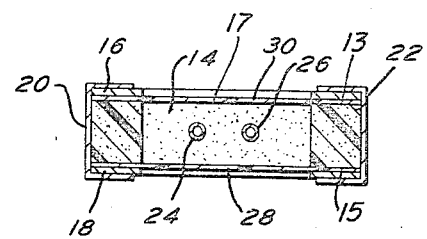
FIGURE 4 is a cross sectional view taken substantially along the plane indicated by the line 4—4 of FIGURE 2.

The membranes 28 and 30, as can be seen in FIGURES 2, 3 and 4, are of a size and shape to completely cover the orifice and to overlap the faces 13 and 15 of the ring. The membranes are removably secured to the faces of the ring 14. Hence, stainless steel washers 16 and 18 are placed over the membranes 28 and 30, respectively. Two or more stainless steel U-shaped clips such as 20 and 22 are placed about the washers, membranes, and ring 14 to clamp them tightly together. Since the ring 14 is formed from resilient material, it will be compressed by the clips 20, 22. The ring 14 will tend to expand under the bias of the clips and hence form a tight seal with the periphery of the membranes 28 and 30.

A pair of flexible conduits of vinyl, Teflon or silicone rubber tubing, are preferably passed through the ring into its closed orifice. When the chamber 10 is implanted within a body cavity in the animal 12, the tubes 24 and 26 will protrude from the animal's body thereby enabling access to the closed orifice within the ring 14.

With the chamber 10 implanted within the body cavity within the animal 12, as shown in FIGURE 1, an in vivo growth may be introduced into the body cavity. The growth may be dispersed within a solution or suspension and injected into the conduit 24 into the closed orifice in the chamber 10. Air within the closed orifice will be displaced and can leave the chamber through the conduit 26.

Once the growth has been injected into the closed orifice within the chamber 10, it cannot escape, if the membranes 28 and 30 are properly selected as to pore size. Further, the solid silicone rubber ring 14 will not allow the solution or suspension to escape. However, various constituents of the body fluids within the tissues of the animal 12 can pass through the membranes 28 and 30 depending on the nature of the membranes and their porosity. Hence, the body constituents of the animal 12 can enter the orifice in the implant chamber 10 and the effect of the body constituents on the growth can be studied.

It should also be apparent that a sampling of the growth may be withdrawn from the chamber 10 at any time for analysis, without removing the chamber 10 from the body cavity in the animal 12. This may be readily accomplished by withdrawing fluid through the conduit 26. Air will enter via tube 24 and displace the fluid withdrawn. It should be noted that tubes 24 and 26 may be used interchangeably.

If the chamber 10 is ever removed, the components thereof can be reused. It is only necessary to remove the clips and disassemble the chamber. The membranes 28, 30 can be removed and replaced. The chamber 10 can then be reassembled for reintroduction into an animal cavity.

The silicone rubber ring 14, and the polished stainless steel washers 16, 18, as well as the stainless steel clips are all chemically inert with the animal's body constituents. Hence, the components of the implanted chamber 10 will not interfere with the operation of the device.

Once the growth has been implanted within the chamber 10, a plug may be inserted within the tubes 24, 26 to prevent contamination of the growth. If the tubes 24, 26 are formed from vinyl, they may be heat sealed closed.

The chamber 10 is constructed of materials which are autoclaveable either in their assembled or disassembled condition.

It should be understood that the tubes 24 and 26 may be eliminated, if desired, and the growth placed in the chamber 10 prior to its implantation in the animal. Also, only one sampling tube may be used.

The implant chamber 10 can be put to other uses, if desired. For example, the chamber 10 can be used for tissues transplantation studies or as a small dialysis chamber for enzymatic assay.

The present invention may be embodied in other specific forms without departing from the spirit or essential attributes thereof and, accordingly, reference should be made to the appended claims, rather than to the foregoing specification as indicating the scope of the invention.

I claim:

1. An implant chamber adapted to be inserted within a body cavity of an animal comprising a ring formed of resilient material, said ring including a pair of opposed faces substantially perpendicular to the axis of said ring and an orifice substantially parallel to the axis of said ring, a pair of dialysis membranes, each membrane being of a size and shape to completely cover said orifice in overlapping relationship with one of the pairs of faces, each of said membranes being associated in overlapping relationship with one of said faces and covering one end of the orifice, clamping means for securing the membranes to the faces of said ring in sealing engagement therewith, and flexible conduit means extending through said ring into said orifice for the introduction and removal of an in vivo growth into and from said orifice after said chamber has been inserted within a body cavity of said animal.

2. An implant chamber in accordance with claim 1 including a second flexible conduit means extending through said ring and into said orifice for allowing air displaced by said in vivo growth to escape from said orifice and for introducing air into said orifice for displacing a portion of said in vivo growth.

3. An implant chamber adapted to be inserted within a body cavity of an animal comprising a ring, said ring including a pair of opposed faces substantially parallel to the axis of said ring and an orifice substantially parallel to the axis of said ring, at least one membrane secured to one of the opposed faces of said ring in sealing engagement therewith and covering said orifice, said membrane being pervious to preselected body constituents residing within the tissues of said animal and impervious to preselected in vivo growths adapted to be placed within said orifice, conduit means extending through said ring and into said orifice for the introduction and removal of an in vivo growth into and from said orifice after said chamber has been inserted within a body cavity of said animal.

4. An implant chamber in accordance with claim 3 wherein said ring is resilient, a rigid washer overlies said membrane, and at least one clip surrounds said ring, membrane and washer to clamp said assembly together in a tight, sealed relationship.

5. An implant chamber adapted to be inserted within a body cavity of an animal comprising a resilient ring of silicone rubber, said ring including a pair of opposed faces substantially perpendicular to the axis of said ring and an orifice substantially parallel to the axis of said ring, a membrane overlying each of the opposed faces of said ring and closing both ends of said orifice, said membranes being pervious to preselected body constituents within the tissues of said animal and impervious to preselected in vivo growths adapted to be placed within said orifice, first flexible conduit means extending through said ring and into said orifice for the introduction and removal of an in vivo growth into and from said orifice after said chamber has been inserted within a body cavity of said animal, a second flexible conduit means extending through said ring and into said orifice for allowing air displaced by the introduced in vivo growth to escape from said orifice and for introducing air into said orifice for displacing a portion of said in vivo growth, a polished stainless steel washer overlying each membrane and at least one polished stainless steel clip surrounding said ring, membranes, and washers for clamping said assembly together in a tight, sealed relationship.

6. An implant chamber adapted to be inserted within a body cavity of an animal comprising a ring, said ring including a pair of opposed faces substantially perpendicular to the axis of said ring and an orifice substantially parallel to the axis of said ring, a membrane secured to each of the opposed faces of said ring in sealing engagement therewith and closing said orifice, said membranes being pervious to preselected body constituents residing within the tissues of said animal and impervious to preselected in vivo growths adapted to be placed within said orifice, first flexible conduit means extending through said ring into said orifice for the introduction and removal of an in vivo growth into and from said orifice after said chamber has been inserted within a body cavity of said animal, second flexible conduit means extending through said ring and into said orifice for allowing air displaced by said in vivo growth to escape from said orifice and for introducing air into said orifice for displacing a portion of said in vivo growth, and means surrounding said membranes and ring for removably clamping them together in tight, sealed engagement.

7. An implant chamber adapted to be inserted within a body cavity of an animal comprising a ring, said ring including a pair of opposed faces substantially perpendicular to the axis of said ring and an orifice substantially parallel to the axis of said ring, a membrane secured to each of the opposed faces of said ring in sealing engagement therewith and closing said orifice, said membranes being pervious to preselected body constituents residing within the tissues of said animal and impervious to preselected in vivo growths adapted to be placed within said orifice, and means surrounding said membranes and ring for removably clamping them together in tight, sealed engagement.

References Cited by the Examiner

UNITED STATES PATENTS

| | | | |
|---|---|---|---|
| 2,682,057 | 7/1951 | Lord | 3—1 |
| 3,189,023 | 6/1965 | Salz et al. | 128—2.05 |
| 3,198,195 | 7/1965 | Chardack | 128—419 |
| 3,236,240 | 2/1966 | Bradley | 138—421 |

ROBERT E. MORGAN, *Acting Primary Examiner.*

SIMON BRODER, *Examiner.*